US012570375B2

(12) United States Patent
Vachon et al.

(10) Patent No.: US 12,570,375 B2
(45) Date of Patent: Mar. 10, 2026

(54) WINDSHIELD ASSEMBLY FOR A VEHICLE

(71) Applicant: BOMBARDIER RECREATIONAL PRODUCTS INC., Valcourt (CA)

(72) Inventors: Marc Vachon, St-Denis-de-Brompton (CA); Simon Baldachino, Bromont (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 346 days.

(21) Appl. No.: 18/365,985

(22) Filed: Aug. 5, 2023

(65) Prior Publication Data

US 2025/0042511 A1      Feb. 6, 2025

(51) Int. Cl.
| | |
|---|---|
| *B63B 17/02* | (2006.01) |
| *B62J 17/04* | (2006.01) |
| *B63B 34/10* | (2020.01) |

(52) U.S. Cl.
CPC .............. *B63B 17/02* (2013.01); *B62J 17/04* (2013.01); *B63B 34/10* (2020.02)

(58) Field of Classification Search
CPC .......... B62J 17/04; B63B 17/02; B63B 34/10
USPC ................................................... 114/55.5, 361
See application file for complete search history.

(56) References Cited

U.S. PATENT DOCUMENTS

| | | | |
|---|---|---|---|
| 10,336,409 B1 | 7/2019 | Girard et al. | |
| 12,128,990 B1 * | 10/2024 | Berman | ................. B63B 17/02 |
| 2008/0197658 A1 * | 8/2008 | Yoshitake | ................ B62J 17/04 |
| | | | 296/96.21 |

FOREIGN PATENT DOCUMENTS

| | | | |
|---|---|---|---|
| CA | 2262038 A1 * | 8/1999 | ............ B62M 27/02 |

* cited by examiner

*Primary Examiner* — Tye William Abell
(74) *Attorney, Agent, or Firm* — BCF LLP

(57)      ABSTRACT

A windshield assembly for a vehicle, the windshield assembly comprising: a windshield having a lower end and an upper end; a windshield base attached to the lower end of the windshield; and a deck panel configured for connecting to the vehicle. The deck panel is slidingly connected to the windshield base for permitting the windshield to move linearly, with respect to the deck panel, from a rest position, responsive to a force in a plane of the windshield. The deck panel is pivotally connected to the windshield base about a first pivot axis for permitting the windshield to rotate about the first pivot responsive to a force perpendicular to the windshield.

20 Claims, 18 Drawing Sheets

WINDSHIELD ASSEMBLY FOR A VEHICLE

TECHNICAL FIELD

The present disclosure relates to a windshield assembly for a vehicle, and a vehicle having a windshield assembly.

BACKGROUND

Vehicles such as boats, snowmobiles and ATVs, have windshields for deflecting air around an operator. It is known for windshields on some of those types of vehicles to be easily removable. Some of these removable windshields are held in place via grommets that, in addition to allowing the user to easily remove the windshield when so desired, also allows the windshield to detach from the vehicle in the event of an impact.

However, in the case of personal watercraft, such detachable windshields would fall in the water, making them difficult to retrieve. Also, once retrieved, the user cannot go on the side or the front of the vehicle to reinstall the windshield while in the middle of a body of water. Additionally, the pitch and roll of the personal watercraft also makes it difficult to align the grommets with their corresponding holes.

In addition, the chances that a rider undergoes an unwanted movement resulting in an impact with a windshield will vary between different types of vehicle and between different riding contexts. Certain types of unwanted movement may be more likely using one type of vehicle than another.

Therefore, there is a desire for a windshield assembly for a vehicle, such as a personal watercraft, that addresses the abovementioned limitations of the prior art and that increases safety in response to unwanted movements by the rider.

Therefore, there is a desire for a windshield assembly for a vehicle, such as a personal watercraft, which addresses the abovementioned limitations of the prior art and that increases safety in response to unwanted movements by the rider.

SUMMARY

It is an object of the present to ameliorate at least some of the inconveniences present in the prior art.

From one aspect there is provided a windshield assembly for a vehicle, the windshield assembly comprising: a windshield having a lower end and an upper end; a windshield base attached to the lower end of the windshield; and a deck panel configured for connecting to the vehicle. The deck panel is slidingly connected to the windshield base for permitting the windshield to move linearly, with respect to the deck panel, from a rest position, responsive to a force in a plane of the windshield. The deck panel is pivotally connected to the windshield base about a first pivot axis for permitting the windshield to rotate about the first pivot responsive to a force perpendicular to the windshield.

In some implementations, the windshield assembly further comprises a resilient member between the windshield base and the deck panel for permitting the windshield to move linearly with respect to the deck panel, wherein the resilient member is configured to resiliently bias the windshield away from the deck panel.

In some implementations, a lower end of the resilient member is connected to the deck panel and an upper end of the resilient member is detachably attached to the windshield base.

In some implementations, the resilient member is a linear gas spring and the upper end of the linear gas spring is detachably attached to the windshield base by a spring clip of a spring clip assembly.

In some implementations, the windshield assembly further comprises arms extending transversely from the upper end of the linear gas spring, and wherein the spring clip assembly has a recess portion configured to receive the arms to detachably attach the linear gas spring to the windshield base.

In some implementations, the windshield assembly further comprises a head portion at the upper end of the linear gas spring, the head portion being rotatably received in the spring clip to permit a rotation of the windshield base relative to the deck panel when the arms are received by the spring clip.

In some implementations, the linear gas spring extends substantially parallel to the plane of the windshield when the windshield is in the rest position.

In some implementations, the windshield assembly further comprises a left hinge and a right hinge pivotally connecting the deck panel and the windshield base, each of the left and right hinges comprising a first arm connected to the deck panel at a first point, the first point comprising the first pivot, and a second arm connected to the windshield base at a second point.

In some implementations, the second point is disposed upwardly and rearwardly of the first point when the windshield is in the rest position, and the second point is disposed upwardly and forwardly of the first point when the windshield is in a rotated position.

In some implementations, the hinge member further comprises a stopper arm which is configured to engage the deck panel after a predetermined rotation about the first pivot.

In some implementations, the predetermined rotation is at least 50 degrees.

In some implementations, the first arm extends along a portion of the deck panel, the second arm extends upwardly from the deck panel, and the stopper arm extends downwardly from the deck panel when the windshield is not rotated.

In some implementations, the stopper arm extends through an aperture in the deck panel and is configured to contact an underside of the deck panel when the windshield is rotated.

In some implementations, the windshield assembly further comprises a second pivot at the second point permitting the windshield to rotate about a second pivot axis responsive to a force perpendicular to the windshield.

In some implementations, the left hinge and the right hinge are disposed at respective lateral sides at a lower end of the windshield base.

From another aspect, there is provided a vehicle comprising: a vehicle body having at least one external surface; a motor supported at least in part by the vehicle body; a propulsion system connected to the vehicle body and operatively connected to the motor; a windshield assembly comprising: a windshield having a lower end and an upper end; a windshield base attached to the lower end of the windshield; and a deck panel connected to the vehicle body. The deck panel is slidingly connected to the windshield base for permitting the windshield to move linearly, with respect to the deck panel, from a rest position, responsive to a force in a plane of the windshield. The deck panel is pivotally connected to the windshield base about a first pivot axis for permitting the windshield to rotate about the first pivot responsive to a force perpendicular to the windshield.

In some implementations, the vehicle further comprises a straddle seat and a handlebar, wherein the windshield assembly is positioned at least partially forward of the straddle seat and the handlebar.

In some implementations, the vehicle is a personal watercraft, and the vehicle body comprises a hull and a deck supported on the hull, the straddle seat being provided on the deck, and the windshield assembly being provided on the deck.

From a yet further aspect, there is provided a windshield assembly for a vehicle, the windshield assembly comprising: a windshield having a lower end and an upper end; a windshield base attached to the lower end of the windshield; a deck panel connectable to the vehicle and movably connected to the windshield base by: a first mechanism permitting the windshield to move linearly with respect to the deck panel responsive to a first force; and a second mechanism permitting the windshield to rotate about a first pivot responsive to a second force.

In some implementations, the first mechanism is a resilient member linearly connecting the windshield base and the deck panel, and the second mechanism is a hinge member pivotably connecting the windshield base and the deck panel.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as a deck or hull for example, should be understood as they would be understood when these components or sub-assemblies are mounted to the vehicle, unless specified otherwise in this application. The term "straddle seat" refers to a seat on which a person normally sits astride. The term "motor" can refer to any component capable of driving the motion of a watercraft, which includes but is not limited to an internal combustion engine or an electric motor.

Implementations of the present technology each have at least one of the abovementioned object and/or aspects, but do not necessarily have all of them. It should be understood that some aspects of the present technology that have resulted from attempting to attain the abovementioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A windshield assembly 200 will be described with respect to a personal watercraft 20. However, it is contemplated that the windshield assembly could be provided in different types of vehicles, such as any vehicle having an exposed seating area and on which a windshield could be provided, such as vehicles having a straddle-seat, such as motorbikes, all-terrain vehicles (ATVs), and snowmobiles.

Figure 1:
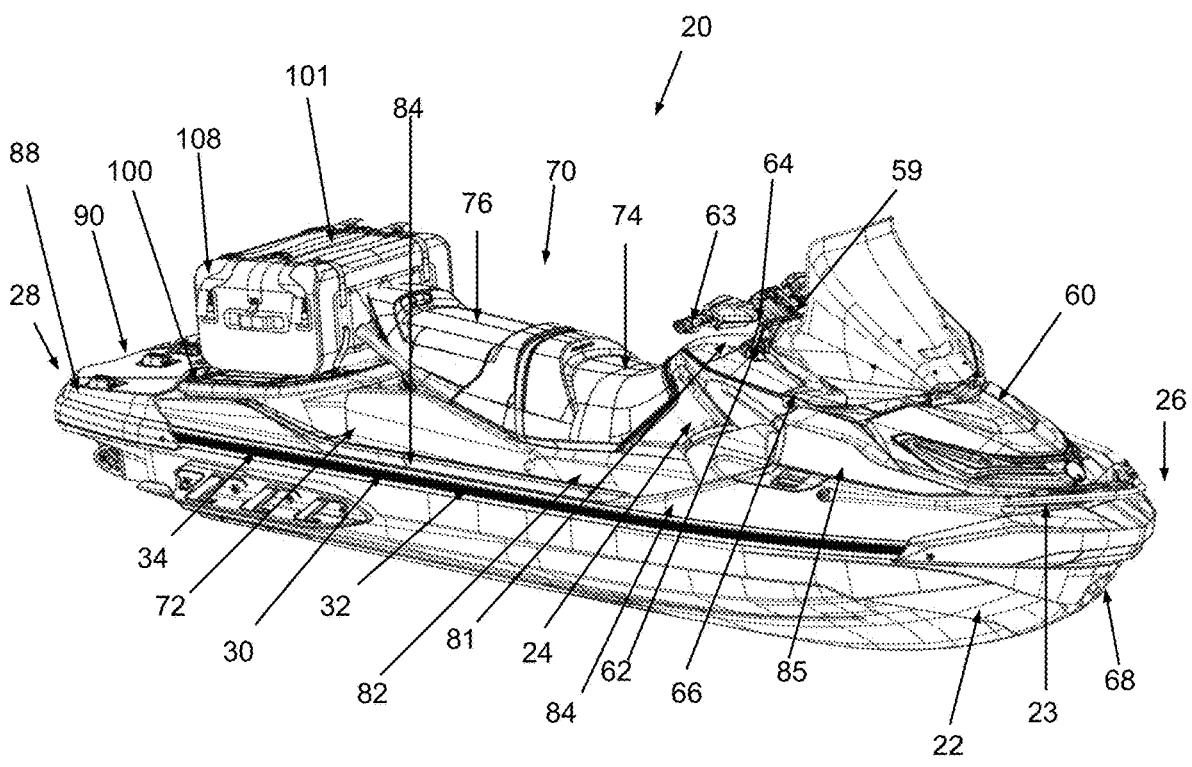
FIG. 1 is a front, right side perspective view of a personal watercraft, including a windshield assembly according to one implementation of the present technology.
Figure 2:
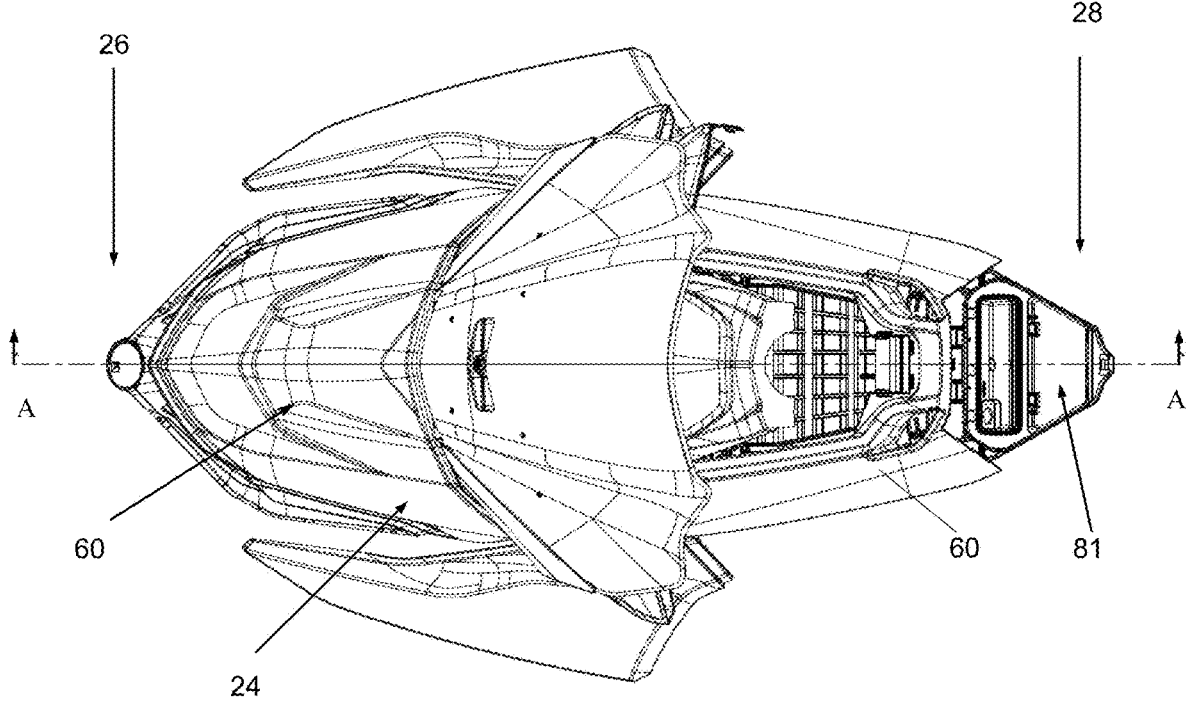
FIG. 2 is a top view of the windshield assembly and a portion the personal watercraft of FIG. 1.

Referring to FIG. 1, an implementation of the personal watercraft 20, to which the windshield assembly 200 of the present technology can be attached, is shown. The personal watercraft 20 has a hull 22 and a deck 24. The hull 22 and the deck 24 are made of fiberglass composite material. It is contemplated that other suitable materials could be used to make the hull 22 and the deck 24. The hull 22 buoyantly supports the personal watercraft 20 in the water. The hull 22 has a bow 26 and a stern 28.

The deck 24 is designed to accommodate an operator and two passengers, collectively referred to as riders. It is contemplated that the deck 24 could be designed to accommodate more or less than two passengers. The hull 22 and the deck 24 are joined together at a seam 30 that joins the parts in a sealing relationship. The seam 30 comprises a bond line formed by an adhesive. Other known joining methods could be used to engage the parts together, including but not limited to thermal fusion, molding or fasteners such as rivets, bolts or screws. A bumper 32 generally covers the seam 30. The bumper 32 helps to prevent damage to the outer surface of the personal watercraft 20 when the personal watercraft 20 is docked, for example. The bumper 32 can extend around the bow 26 and the stern 28, or around any portion or the entire seam 30. A rail 23 extends around the deck 24 at the bow 26 of the personal watercraft 20, and is spaced upwardly from the seam 30 and below the hood 60. The rail 23 can function as a grab rail.

The space between the hull 22 and the deck 24 forms a volume commonly referred to as the motor compartment 34, which is shown generally in FIG. 1. The motor compartment 34 accommodates a motor (not shown), in the form of an internal combustion engine, as well as a storage bin (not shown), a fuel tank (not shown), an air box (not shown), an electrical system (battery, electronic control unit, etc.) (not shown), a resonator (not shown) and other elements required or desirable in the personal watercraft 20. The motor drives a water jet propulsion system (not shown) of the personal watercraft 20, although other types of propulsion systems are contemplated in other implementations. It is contemplated the motor could be an electric motor, in which case the fuel tank would be replaced by batteries, and the air intake system and the exhaust system would be omitted.

A steering nozzle of the jet propulsion system is operatively connected to a helm assembly 62, including a handlebar 63, preferably via a push-pull cable (not shown) such that when the helm assembly 62 is turned, the steering nozzle pivots to redirect the jet of water expelled from the jet propulsion system and steer the personal watercraft 20 in the desired direction.

The handlebar 63 is mounted to a handlebar column 59 and is configured such that a height of the handlebar 63 can be adjusted to accommodate for a rider driving the vehicle 20 in a seated or standing stance. A locking mechanism (not shown) may be provided for locking the height of the handlebar 63.

Figure 5:
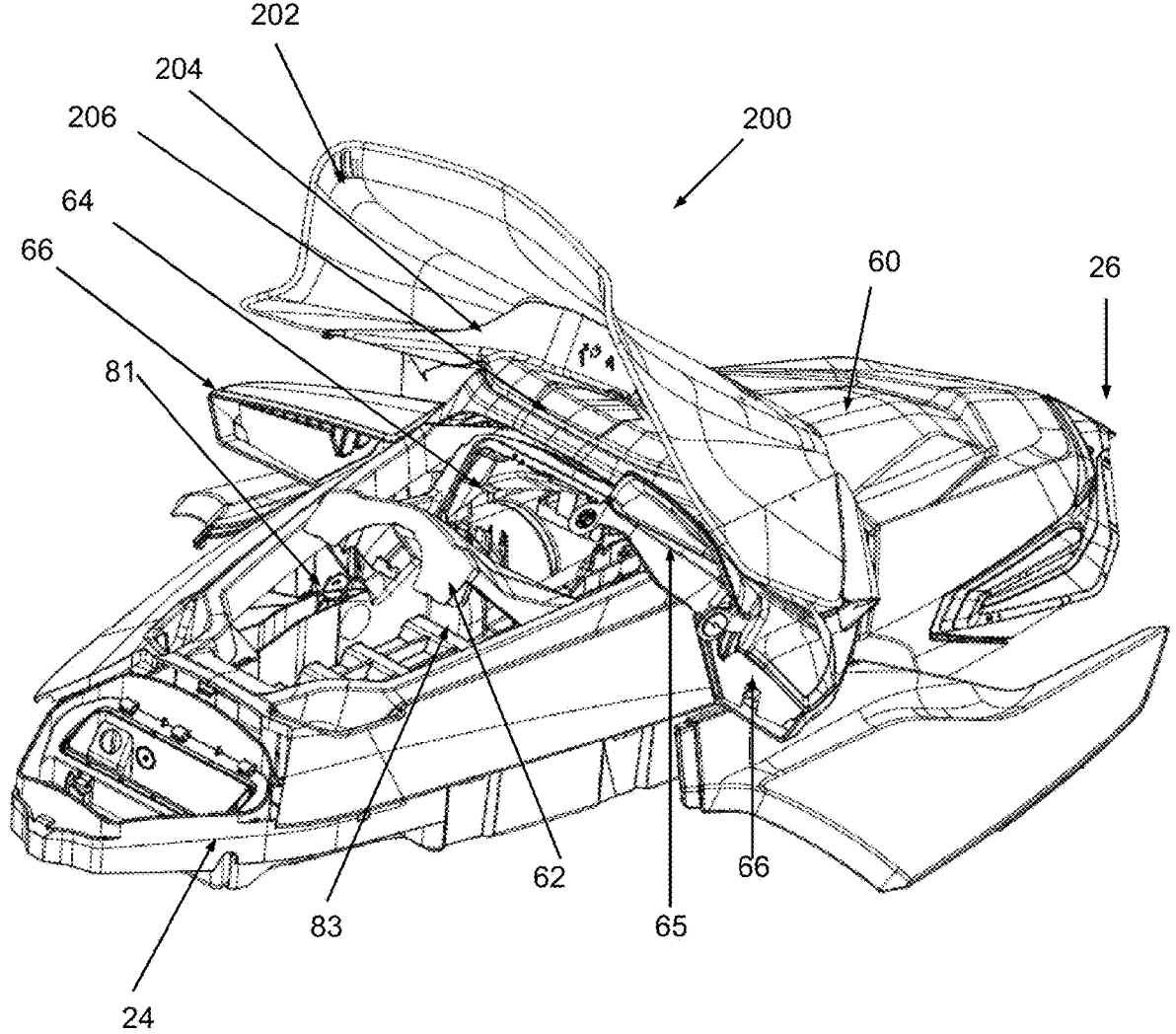
FIG. 5 is a rear, right side perspective view of the windshield assembly and the portion of the personal watercraft of FIG. 2.
Figures 6A, 6B, 6C, 6D:
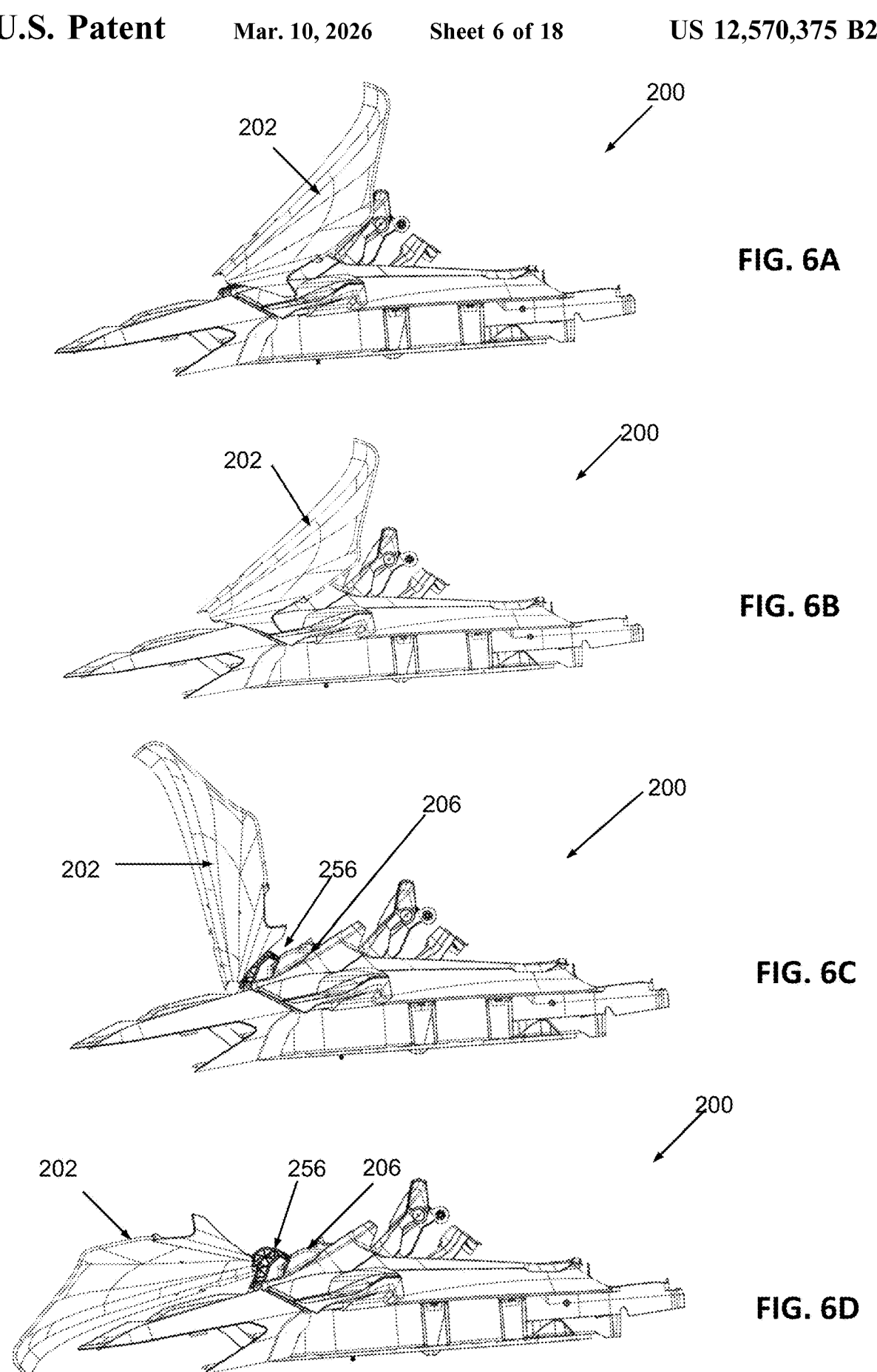
FIGS. 6A, 6B, 6C and 6D are left side views of the windshield assembly and the portion of the personal watercraft of FIG. 2 with the windshield assembly is in a rest position, a first position, a second position and a third position, respectively.
Figure 7:
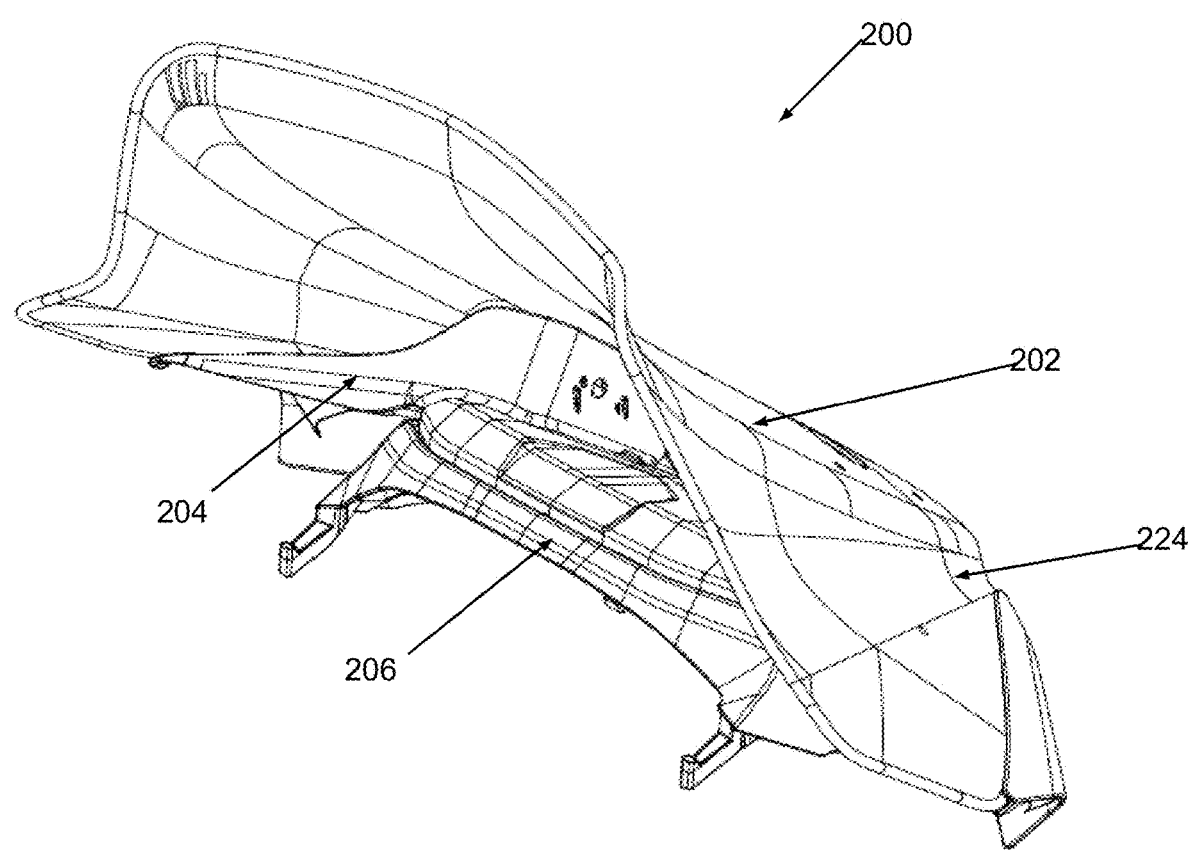
FIG. 7 is a rear, right side perspective view of the windshield assembly of FIG. 1.
Figure 8:
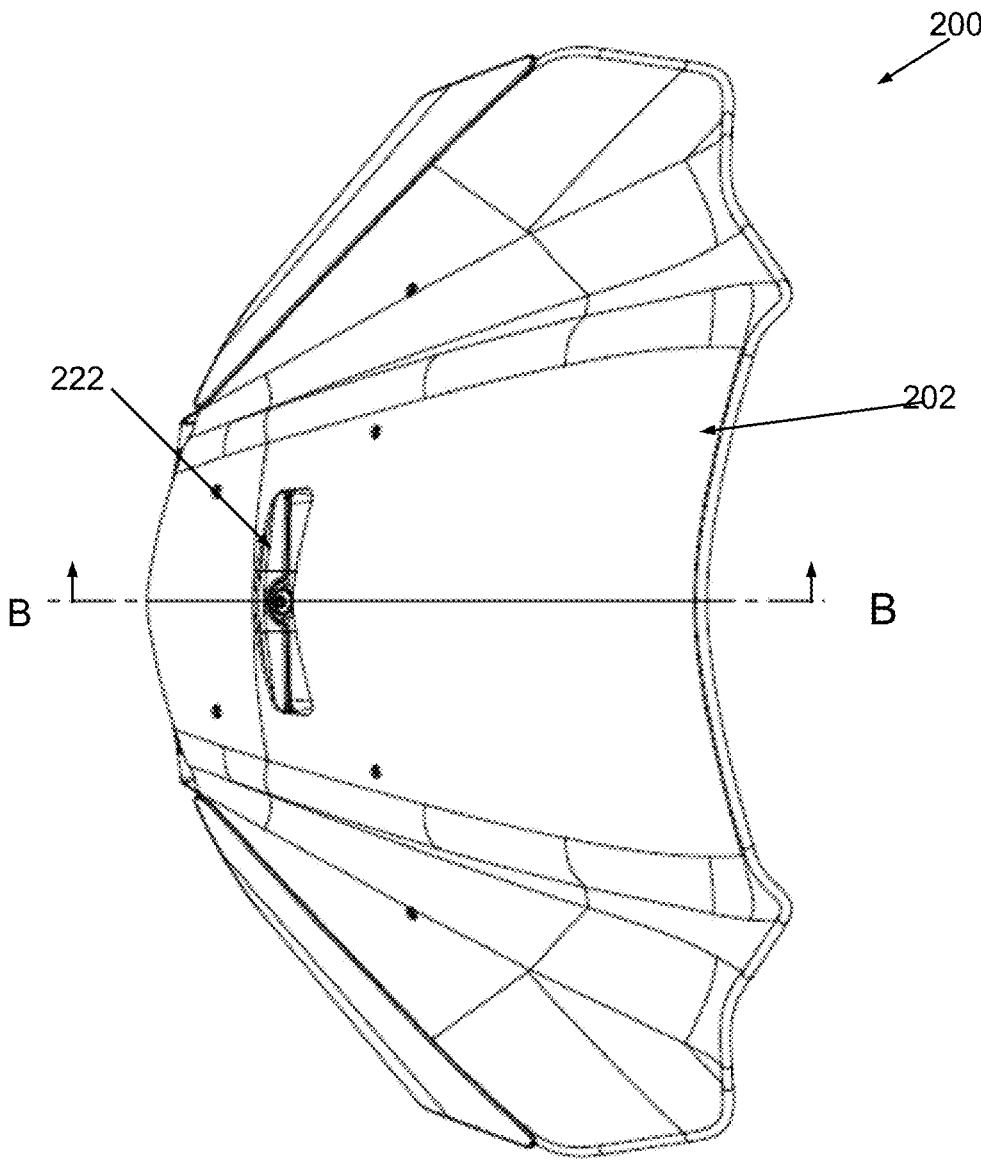
FIG. 8 is a top view of the windshield assembly of FIG. 7.

Towards the bow 26, the deck 24 has a hood 60 including the helm assembly 62 and a display 64. Left and right rearview mirrors 66 are positioned on corresponding left and right sides of the hood 60 to allow the operator to see behind the watercraft 20. In other embodiments, only one of the left and right rearview mirrors 66 may be provided, such as the left rearview mirror 66. As shown in FIG. 5, an arm 65 extends upwardly from the deck 24 on a right side of the display 64. The arm 65 can be used for mounting a GPS display, for example. The arm may have an adjustable position with respect to the deck 24.

Referring back to FIG. 1, a bow eyelet 68 is located at the bow 26 of the hull 22. The bow eyelet 68 can be used to attach the watercraft 20 to a dock when the watercraft 20 is not in use or to attach to a winch when loading the watercraft 20 on a trailer, for instance.

The deck 24 has a centrally positioned straddle seat 70 supported on top of a pedestal 72 formed by the deck 24. The seat 70 has a front seat portion 74 and rear seat portion 76 made as cushioned or padded units. The glovebox 81 is forward of the straddle seat 70 and rearward of the helm assembly 62.

The deck 24 forms footwells 82 that provide support for the riders' feet. Along the footwells 82, the watercraft 20 has a pair of generally upwardly extending walls located on either side of the watercraft 20 known as gunwales or gunnels 84. The gunnels 84 help to prevent the entry of water in the footwells 82 of the watercraft 20, provide lateral support for the riders' feet, and also provide buoyancy when turning the watercraft 20. Towards the bow 26, fairings 85 extend between the gunnels 84 and the hood 60 and further prevent the entry of water in the footwells 82. Forward of a rear end 88 of the deck 24, the deck 24 includes a reboarding platform 90 allowing a rider to easily reboard the watercraft 20 from the water. The reboarding platform 90 extends laterally over a width of the deck 24.

The personal watercraft 20 has a rear platform 100. The rear platform 100 is laterally centered on the deck 24. The rear platform 100 extends forwards between the footwells 82, from the reboarding platform 90. A storage box 101 is optionally disposed on the rear platform 100.

The personal watercraft 20 has other features and components which would be readily recognized by one of ordinary skill in the art, further explanation and description of these components will not be provided herein. U.S. Pat. No. 10,336,409, issued Jul. 2, 2019, the entirety of which is incorporated herein by reference, describes a personal watercraft similar to the personal watercraft 20.

The windshield assembly 200 will now be described in detail with reference to FIGS. 2 to 19.

Figure 3:
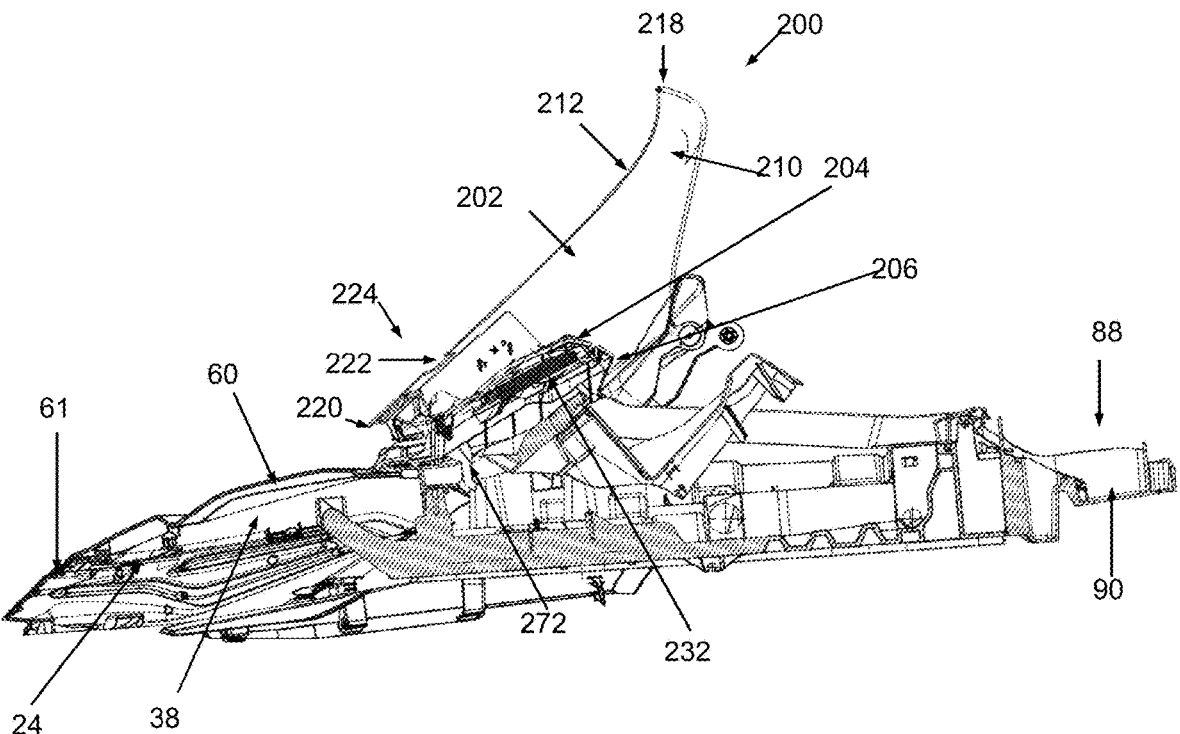
FIG. 3 is a cross-sectional view of the windshield assembly and the portion of the personal watercraft of FIG. 2 taken along line A-A of FIG. 2.
Figure 4:
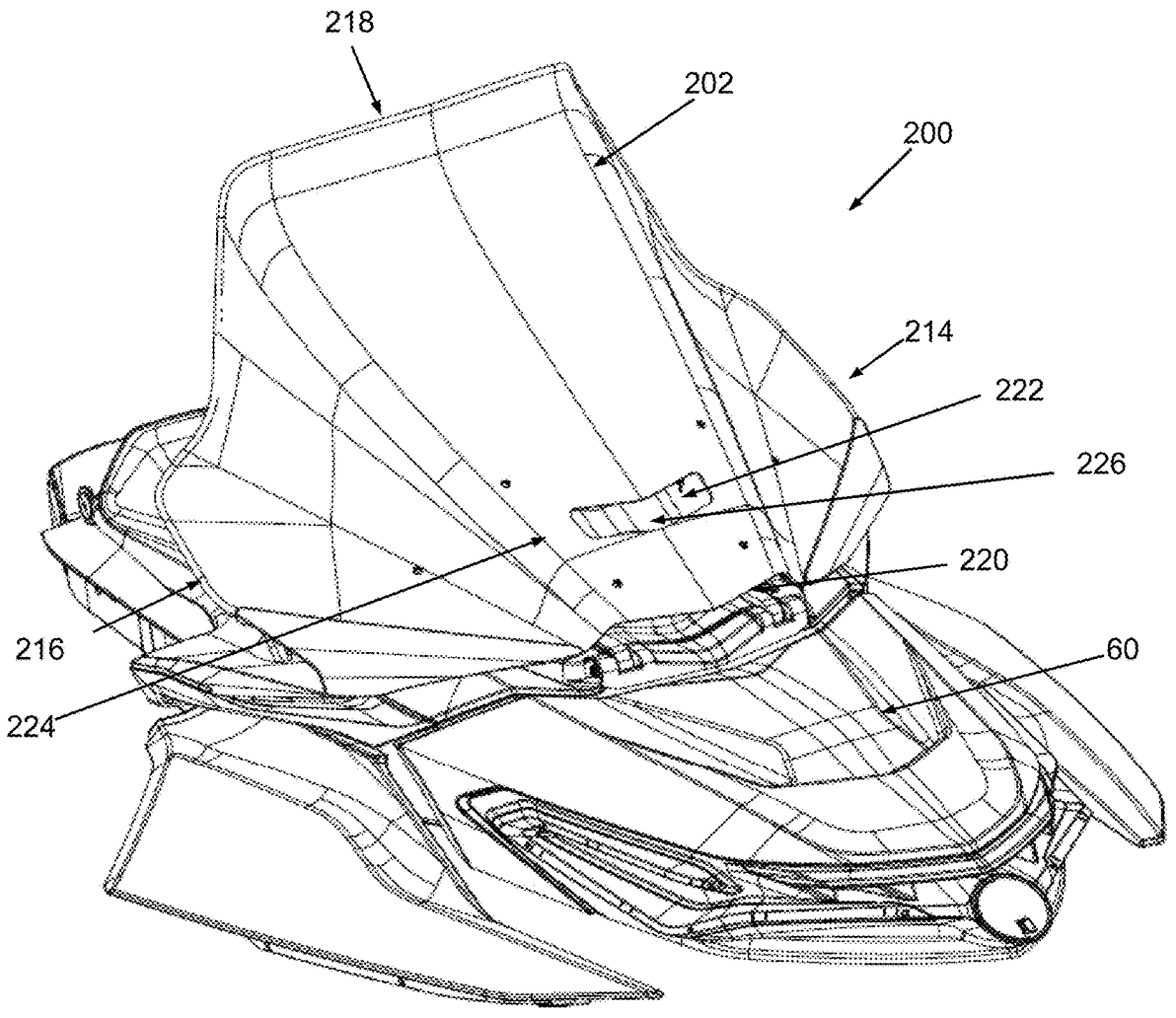
FIG. 4 is a front, right side perspective view of the windshield assembly and the portion of the personal watercraft of FIG. 2.

As best seen in FIG. 3, the windshield assembly 200 comprises a windshield 202, a windshield base 204 attached to the windshield 202 and a deck panel 206 connected to the personal watercraft 20. The deck panel 206 is slidingly connected to the windshield base 204 for permitting the windshield 202 to move linearly with respect to the deck panel 206 responsive to a force in a plane of the windshield 202. The deck panel 206 is also pivotally connected to the windshield base 204 about a pivot axis 208 for permitting the windshield 202 to rotate about the pivot axis 208 responsive to a force perpendicular to the windshield 202. The windshield assembly 200 can thus move in response to impacts both parallel and perpendicular to the plane of the windshield 202.

The windshield 202 is transparent and has an inner side 210, an outer side 212, a left side 214, a right side 216, a top edge 218 and a bottom edge 220. An air vent 222 is provided at a lower end 224 of the windshield 202, proximate the bottom edge 220. The air vent 222 comprises an opening 226 extending through the windshield 202, which opening 226 can be selectively closed and opened. The rider, when seated on the straddle seat 70, will face the inner side 210 of the windshield 202, and be protected from water spray incident on the outer side 212 of the windshield 202.

The windshield base 204 is attached to the lower end 224 of the windshield 202 and extends between the left and right sides 214, 216 of the windshield 202. The deck panel 206 extends between the left and right wing mirrors 66. As mentioned above, the windshield base 204, and hence the windshield 202 to which it is attached, is configured to be movable relative to the deck panel 206 so as to assume different positions relative to the deck panel 206.

Turning to FIGS. 6A-6D, the windshield base 204 is movable between a rest position (FIG. 6A), a first position (FIG. 6B) which is a linear translation, a second position (FIG. 6C) which is a rotation about the pivot axis 208, and a third position (FIG. 6D) which is a rotation about a pivot axis 230.

The windshield assembly 200 can be caused to move from the rest position to any one or more of the first, second and third positions on impact of the windshield assembly 200, such as an impact on the top edge 218 and/or the inner side 210. Movement of the windshield base 204 relative to the deck panel 206 can occur when the windshield assembly 200 is in any of the positions.

The windshield assembly 200 is disposed on the personal watercraft 20 such that the pivot axes 208, 230 are disposed forward of the straddle seat 70, helm assembly 62 and the display 64, and rearward of the hood 60. In the rest and first positions (FIGS. 6A and 6B), the windshield 202 extends generally upwardly and rearwardly. In the second position (FIG. 6C), the windshield 202 extends generally upwardly, and in the third position (FIG. 6D), the windshield 202 extends generally forwardly. In the first and second positions, the bottom edge 220 of the windshield 202 is further forward than in the rest position, the windshield 202 having moved a linear distance.

In the rest position, the deck panel 206 is connected to the windshield base 204 by a resilient member 232 that resiliently biases the windshield 202 and the windshield base 204 away from the deck panel 206. The resilient member 232 is a linear gas spring 232 that extends substantially parallel to the plane of the windshield 202. Other types of resilient members can also be used.

Figure 9:
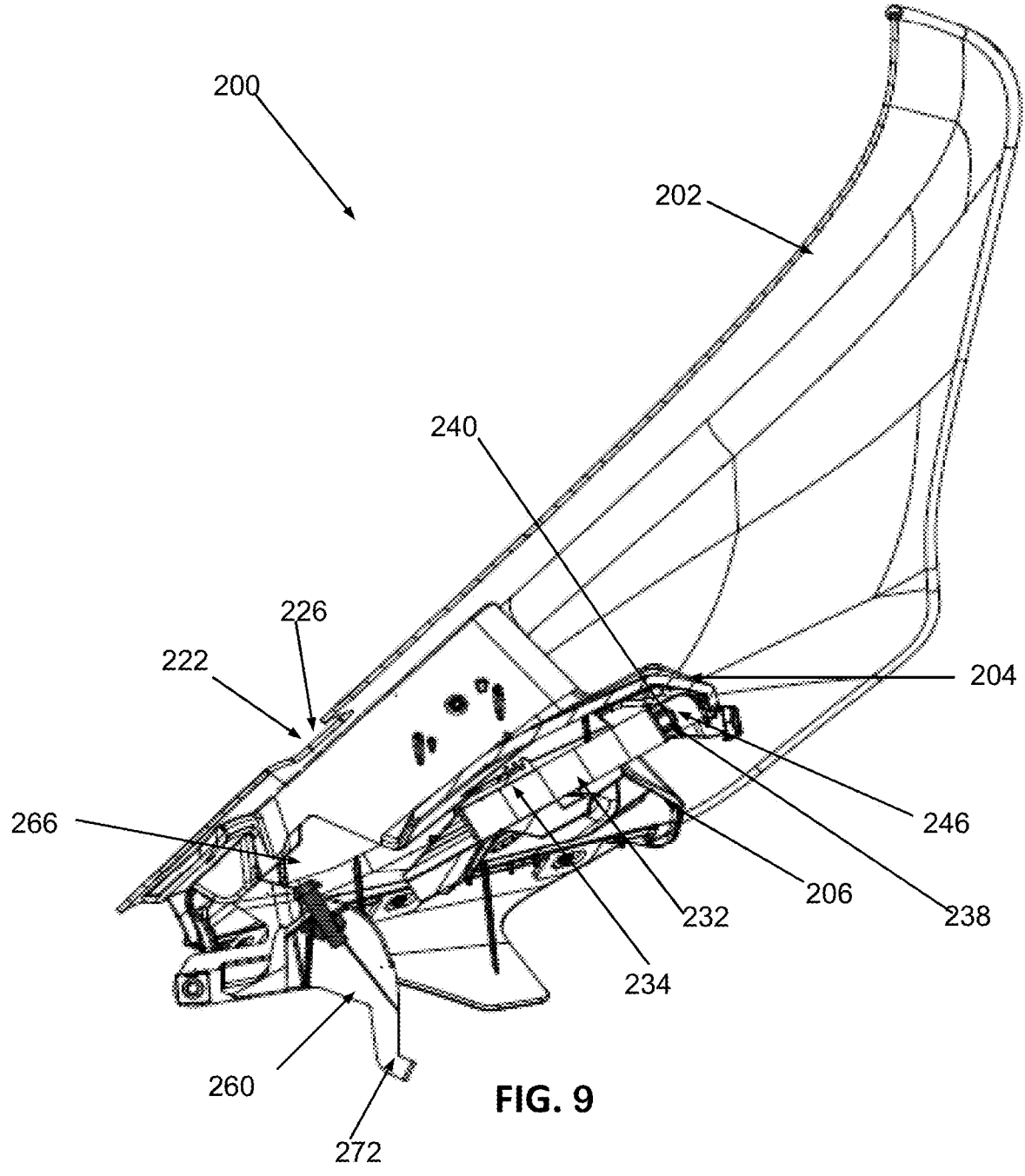
FIG. 9 is a cross-sectional view of the windshield assembly of FIG. 7 taken along line B-B of FIG. 8.
Figure 10:
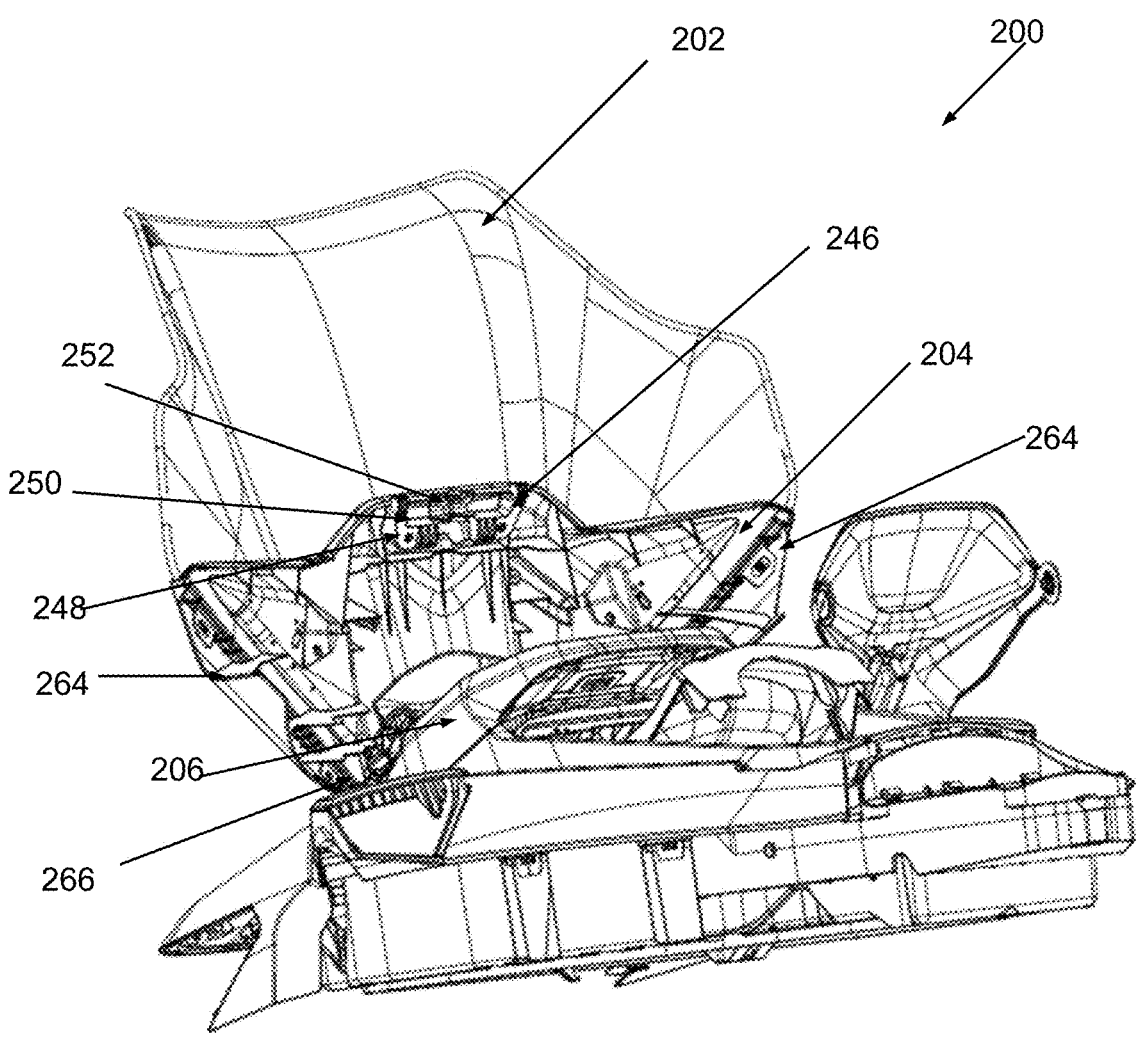
FIG. 10 is a close-up, rear view of the windshield assembly and the portion of the watercraft of FIG. 2 with the windshield assembly in the portion shown in FIG. 6C.
Figures 11, 12:
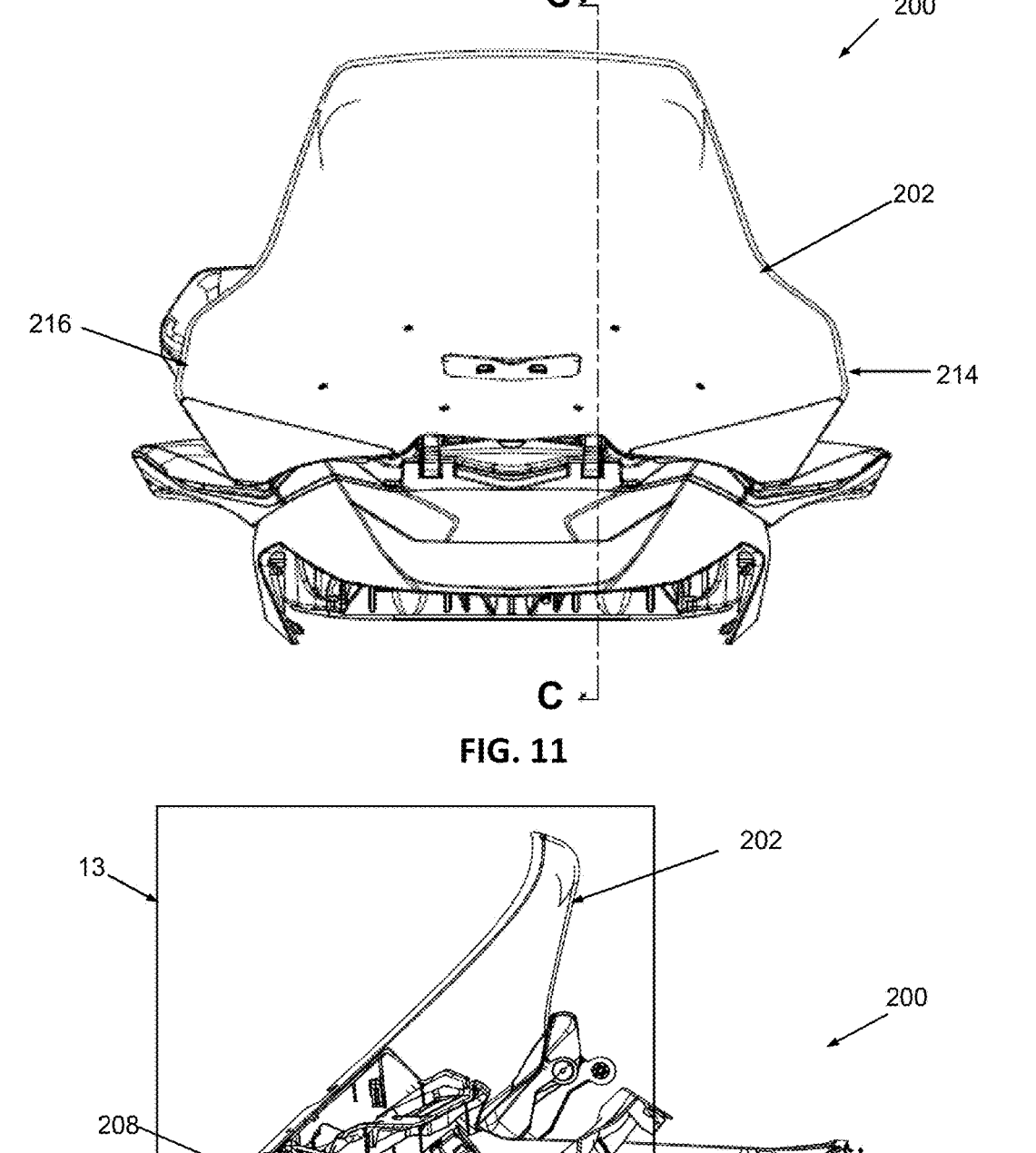
FIG. 11 is a front view of the windshield assembly and the portion of the watercraft of FIG. 2.
FIG. 12 is a cross-sectional view of the windshield assembly and the portion of the watercraft of FIG. 2 taken along line C-C of FIG. 11.
Figure 17:
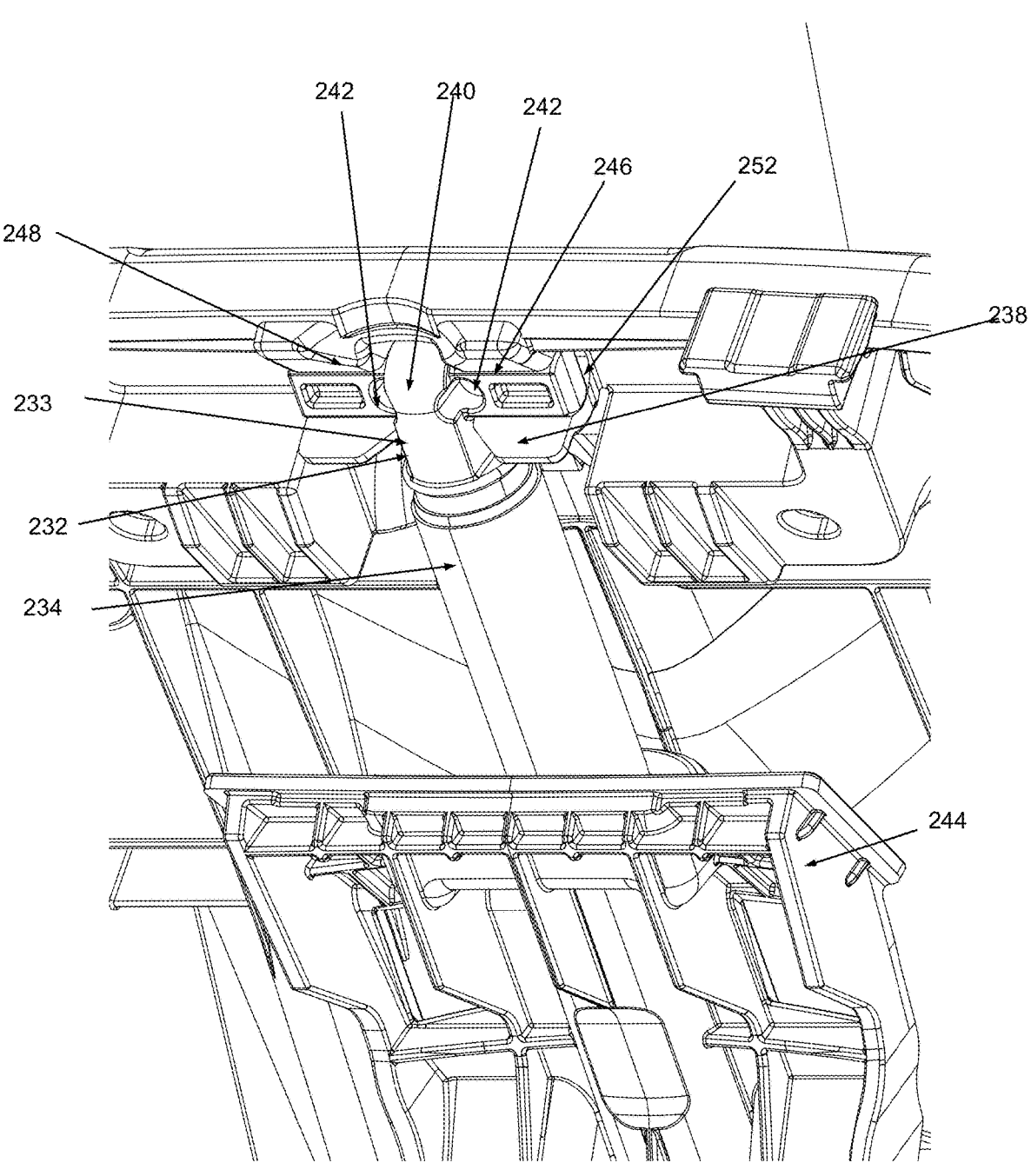
FIG. 17 is the close-up view of FIG. 16 and including the linear gas spring received in the recess.
Figure 18:
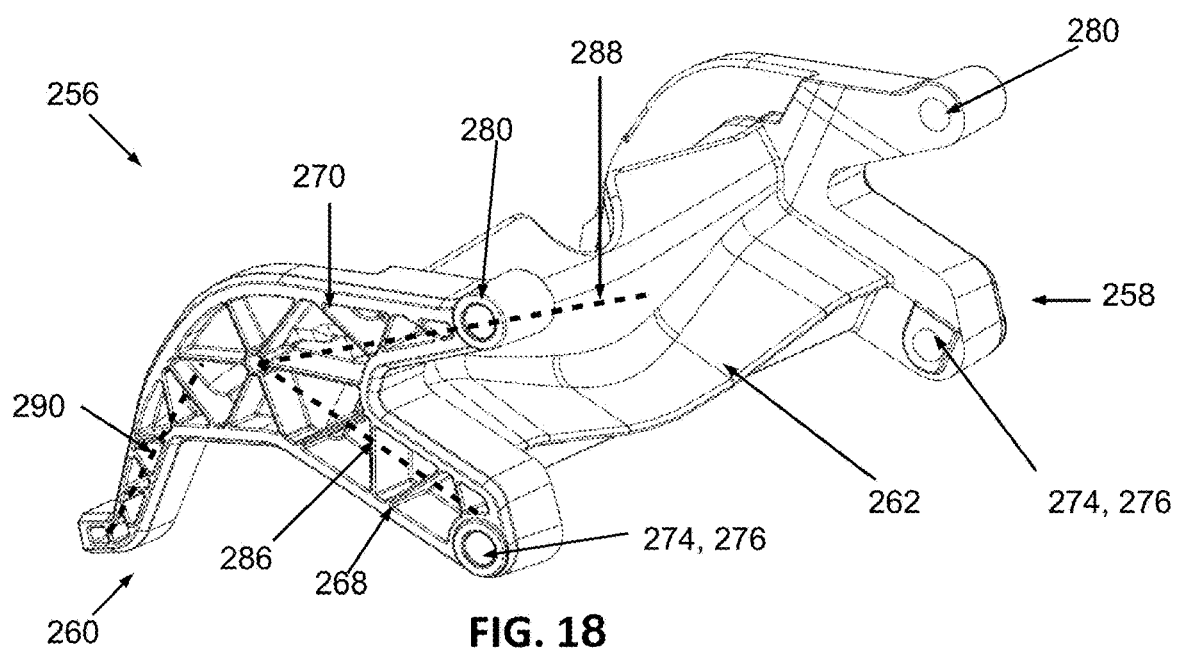
FIG. 18 is a front, right side, perspective view of the hinge member of the windshield assembly of FIG. 7.
Figure 19:
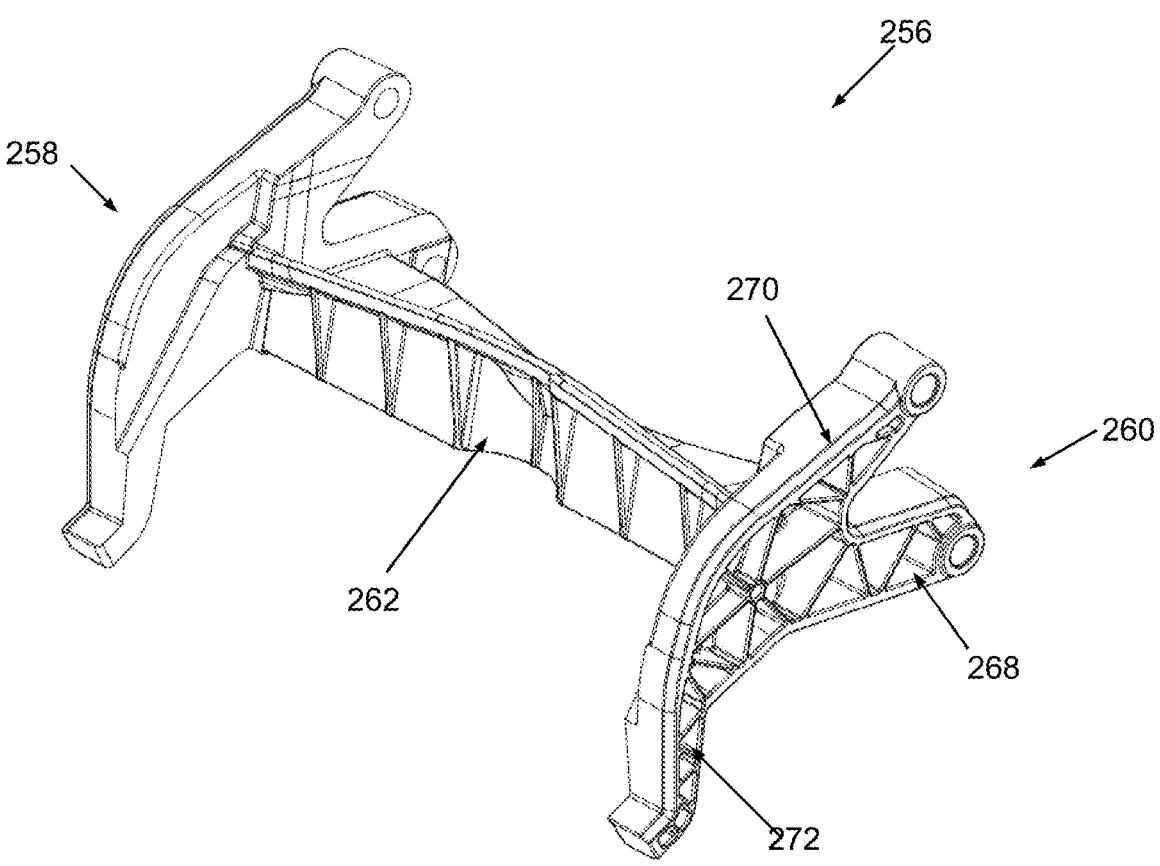
FIG. 19 is a rear, right side perspective view of the hinge member of FIG. 14.

As best seen in FIGS. 9 and 17, the linear gas spring 232 comprises a rod 233 housed in an elongate housing 234. The rod 233 has an upper end 238. At the upper end 238, the rod 233 has a head portion 240 which is rounded. A pair of arms 242 extend transversely from the head portion 240 at the upper end 238. The housing 234 is connected to the deck panel 206 by a mount 244. The rod 233 is able to move linearly within the housing.

A spring clip assembly 246 is attached to the windshield base 204 for detachably connecting the upper end 238 of the linear gas spring 232. With specific reference to FIGS. 15 to 17, the spring clip assembly 246 comprises a body 248 having a recessed portion 250 for housing the arms 242 and the head portion 240 of the linear gas spring 232. A spring clip 252 is provided for fitting around at least a portion of the arms 242. A rotation of the windshield base 204 relative to the deck panel 206 is possible when the arms 242 are received by the spring clip assembly 246.

The deck panel 206 is pivotally connected to the windshield base 204 by a hinge member 256, which is best seen in FIGS. 13A-D, 18 and 19. The hinge member 256 is one-piece and comprises a left hinge 258 and a right hinge 260 separated by a spacer 262. In other embodiments, the spacer 262 may be omitted and the left and right hinges 258, 260 may comprise separate pieces. The left and right hinges 258, 260 are disposed at respective lateral sides 264 at a lower end 266 of the windshield base 204. Each of the left and right hinges 258, 260 comprise an arm 268, an arm 270 and a stopper arm 272. The first arm 268 is pivotally connected to the deck panel 206 at a point 274 by a pivot 276 defining the pivot axis 208. The second arm 270 is pivotally connected to the windshield base 204 at a point 278 by a pivot 280 defining the pivot axis 230. The stopper arm 272 extends through an aperture 282 in the deck panel 206 and is configured to engage an underside 284 of the deck panel 206 after a predetermined rotation about the pivot axis 208. The predetermined rotation is at least 50 degrees, and in some embodiments is 60 degrees. An angle between axes 286, 288 of the first and second arms 268, 270 is about 30-60 degrees, for example 45 degrees. An angle between axes 286, 290 of the first arm 268 and the stopper arm 272 is about 90-120 degrees.

Figure 13A:
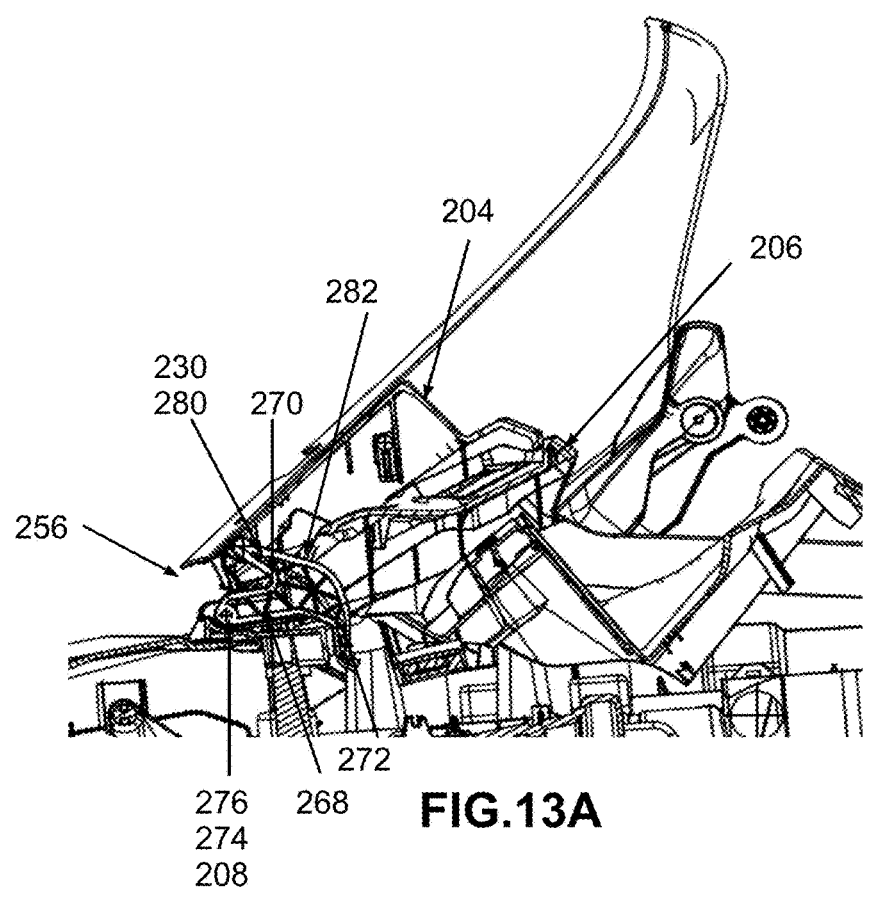
FIGS. 13A, 13B, 13C and 13D are close-up views of the components inside box 13 of FIG. 12 showing a hinge member of the windshield assembly when the windshield assembly is in a rest position, a first position, a second position and a third position, respectively.

When the windshield 202 is in the rest position, the pivot 280 is disposed upwardly and rearwardly of the pivot 276 (FIG. 13A). The first arm 268 extends along a portion of the deck panel 206, the second arm 270 extends upwardly from the deck panel 206, and the stopper arm 272 extends downwardly and spaced from the underside 284 of the deck panel 206.

Figure 13B:
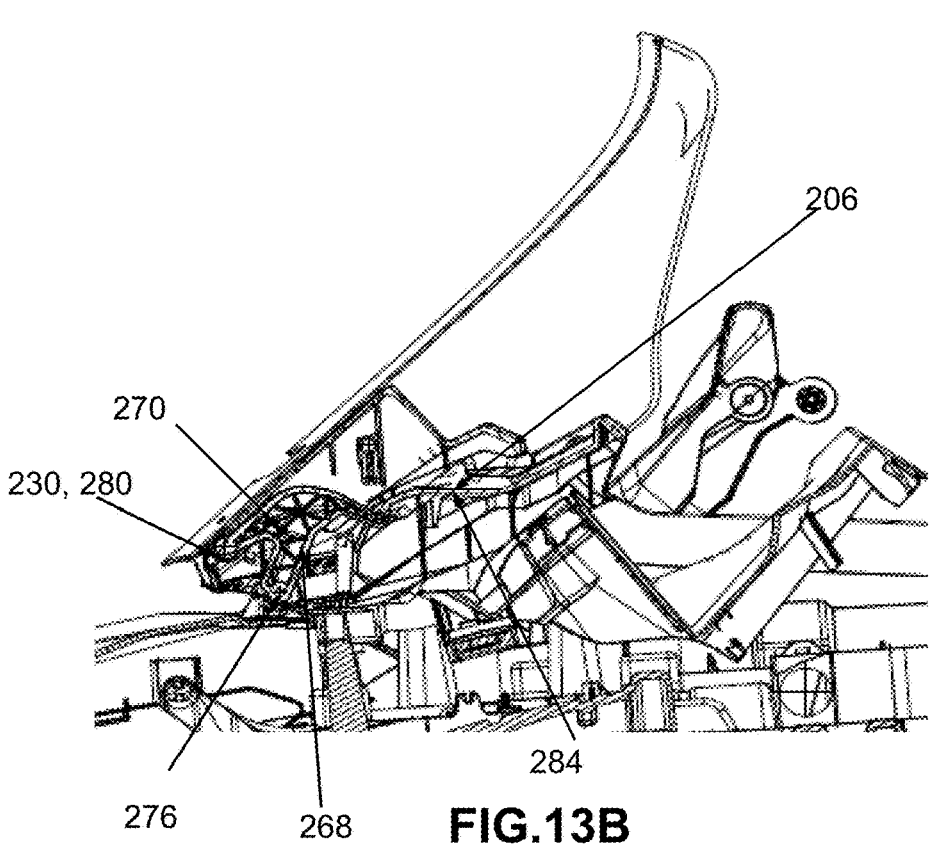

Force applied, such as through impact, on the top edge 218 of the windshield 202 and in the plane of the windshield 202, or a force applied having a component in the plane of the windshield 202, causes the linear gas spring 232 to compress and the windshield base 204 and the windshield 202 to move downwardly and forwardly. Translation of the windshield 202 forwardly and downwardly also causes a rotation of the hinge member 256 about the pivot 276 and the stopper arm 272 to contact the underside 284 of the deck panel 206 (FIG. 13B). When the stopper arm 272 is in contact with the deck panel 206, the linear gas spring 232 is prevented from further compressing.

Figures 13C, 13D:
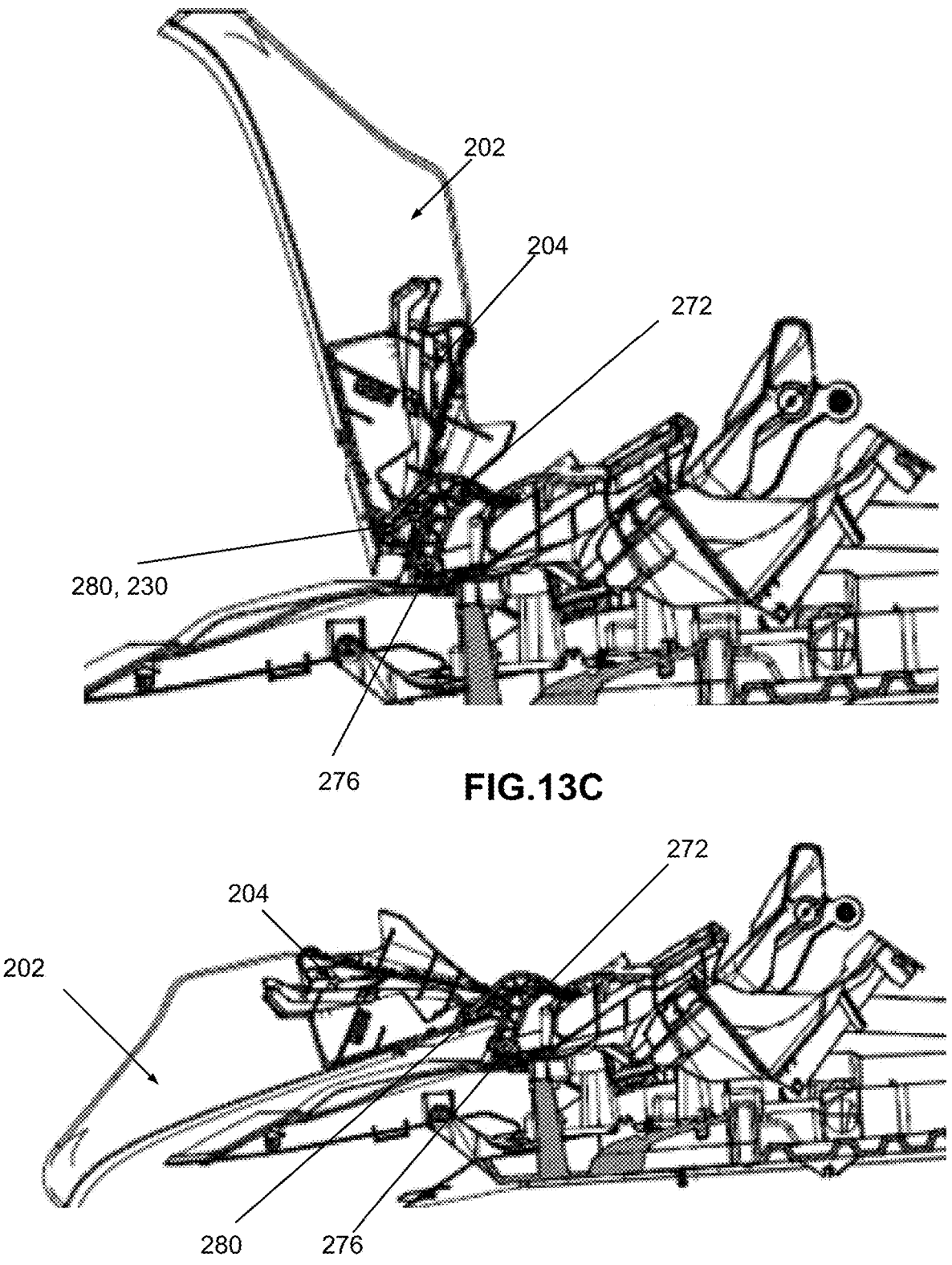
Figure 14:
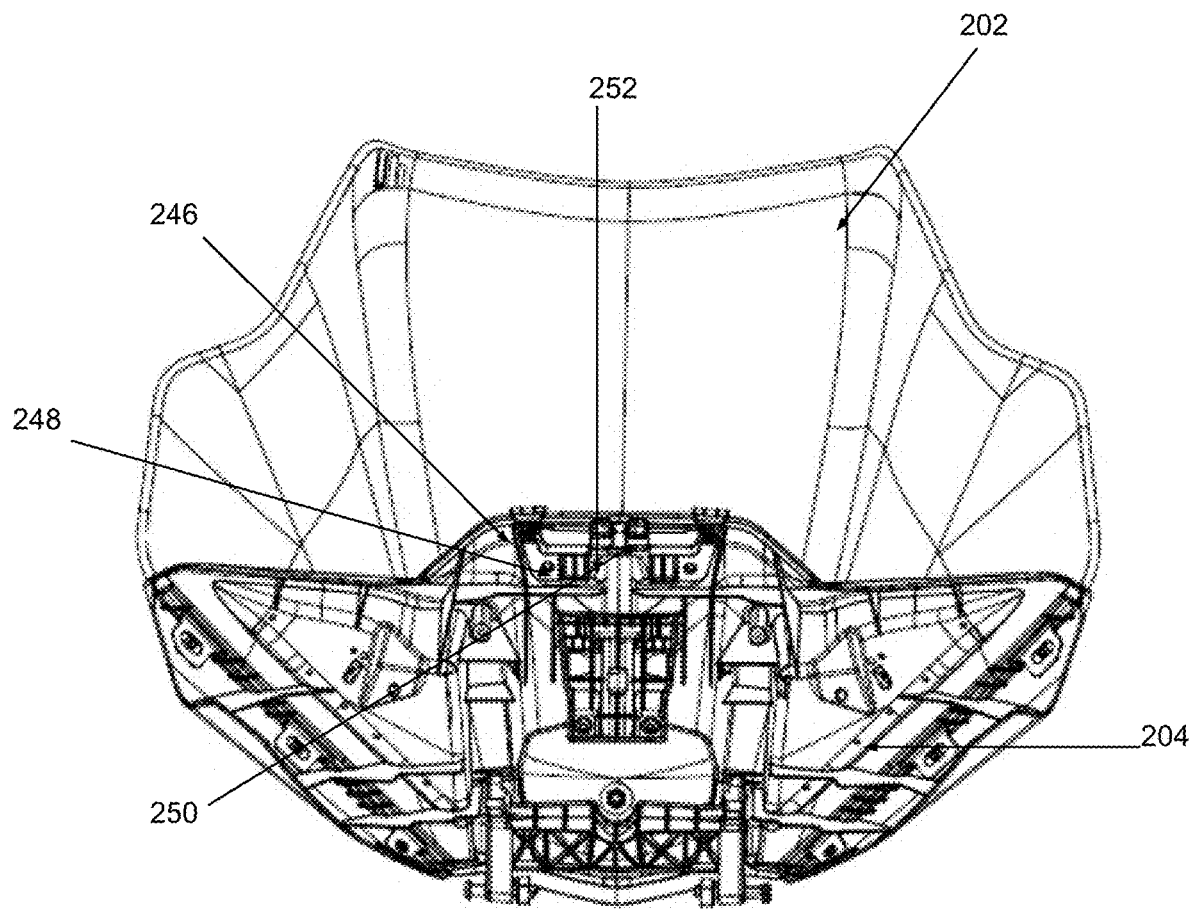
FIG. 14 is a rear view of the windshield assembly of FIG. 7.
Figure 15:
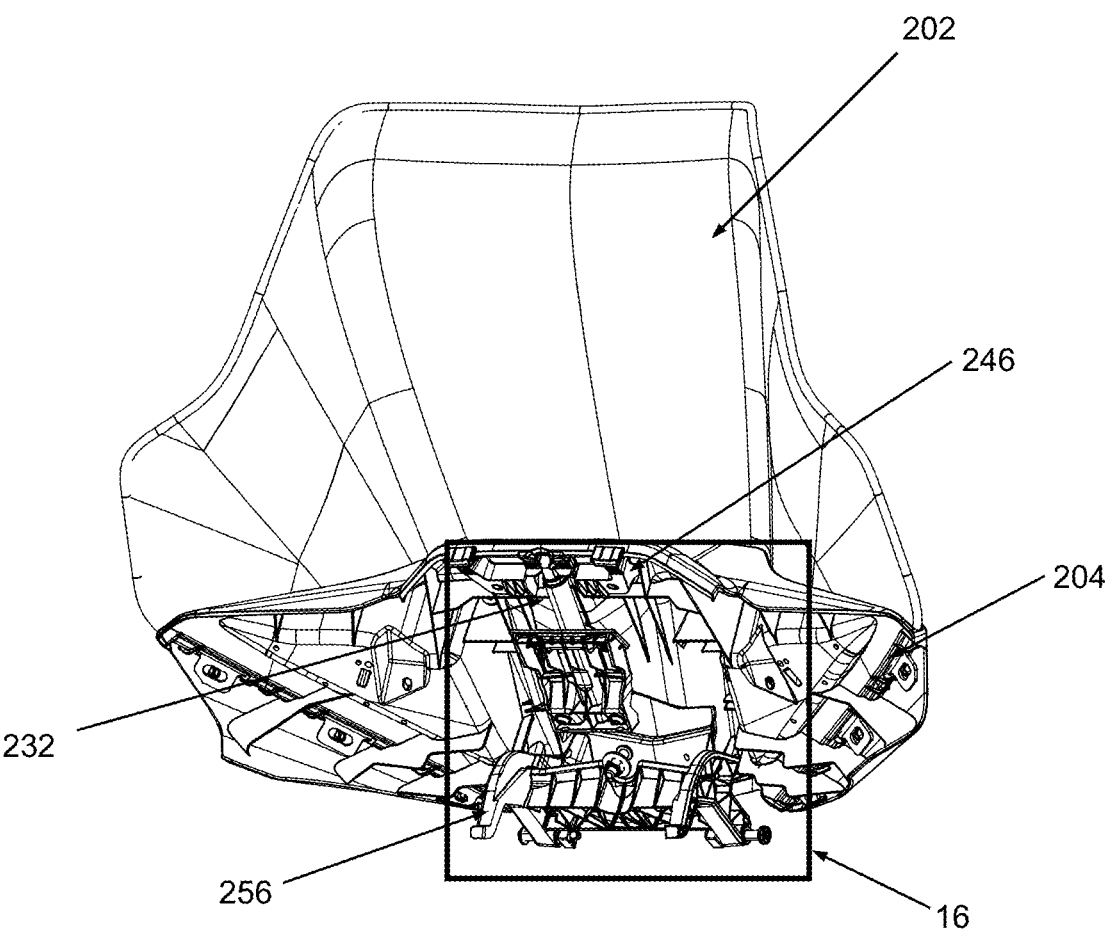
FIG. 15 is a rear, perspective view of the windshield assembly of FIG. 7.
Figure 16:
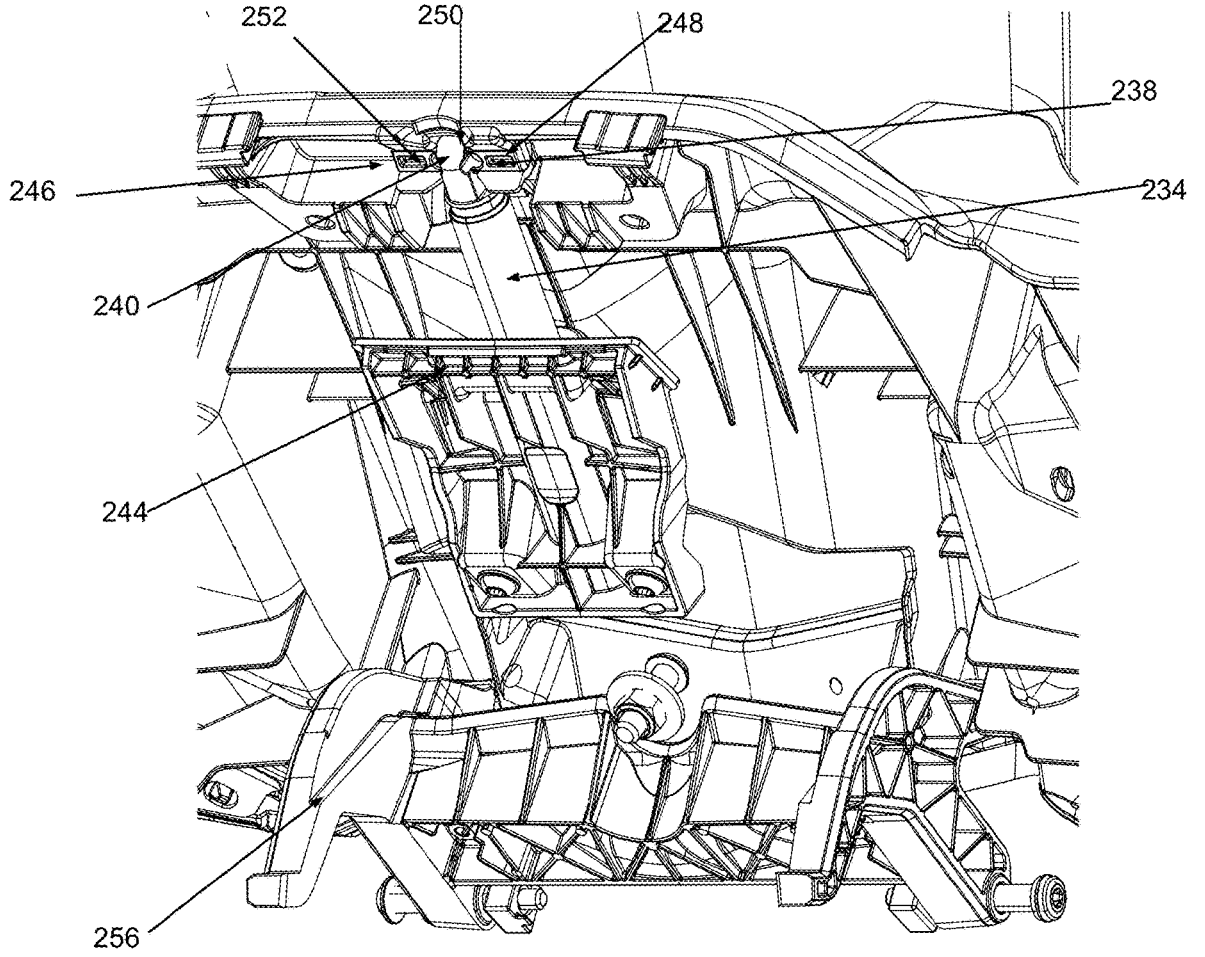
FIG. 16 is a close-up view of the components inside box 16 of FIG. 15 showing a spring clip assembly with a recess for receiving a linear gas spring.

Force applied transversely to the plane of the windshield 202, or a force applied having a component transverse to the plane of the windshield 202, causes a rotation of the windshield 202 and the hinge member 256 about the pivot 276. When the rotation of the hinge member 256 causes the stopper arm 272 to contact the underside 284 of the deck panel 206, the upper end 238 of the linear gas spring 232 is released from the spring clip 252. This allows the windshield 202 to pivot about the pivot axis 230 (FIGS. 13C and D). In these second and third positions, the pivot 280 of each hinge 258, 260 is disposed upwardly and forwardly of the pivot 276.

The windshield 202 can be moved back to the rest position from any of the first position, the second position and third position by reversing the movements.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A windshield assembly for a vehicle, the windshield assembly comprising:
   a windshield having a lower end and an upper end;
   a windshield base attached to the lower end of the windshield; and
   a deck panel configured for connecting to the vehicle,
      the deck panel being slidingly connected to the windshield base for permitting the windshield to move linearly, with respect to the deck panel, from a rest position, responsive to a force in a plane of the windshield, and
      the deck panel being pivotally connected to the windshield base about a first pivot axis for permitting the windshield to rotate about a first pivot responsive to a force perpendicular to the windshield.

2. The windshield assembly of claim 1, further comprising a resilient member between the windshield base and the deck panel for permitting the windshield to move linearly with respect to the deck panel, wherein the resilient member is configured to resiliently bias the windshield away from the deck panel.

3. The windshield assembly of claim 2, wherein a lower end of the resilient member is connected to the deck panel and an upper end of the resilient member is detachably attached to the windshield base.

4. The windshield assembly of claim 3, wherein the resilient member is a linear gas spring and the upper end of the linear gas spring is detachably attached to the windshield base by a spring clip of a spring clip assembly.

5. The windshield assembly of claim 4, wherein the linear gas spring extends substantially parallel to the plane of the windshield when the windshield is in the rest position.

6. The windshield assembly of claim 4, further comprising arms extending transversely from the upper end of the linear gas spring, and wherein the spring clip assembly has a recess portion configured to receive the arms to detachably attach the linear gas spring to the windshield base.

7. The windshield assembly of claim 6, further comprising a head portion at the upper end of the linear gas spring, the head portion being rotatably received in the spring clip to permit a rotation of the windshield base relative to the deck panel when the arms are received by the spring clip.

8. The windshield assembly of claim 1, further comprising a hinge member, the hinge member comprising a left hinge and a right hinge pivotally connecting the deck panel and the windshield base, each of the left hinge and the right hinge comprising a first arm connected to the deck panel at a first point, the first point comprising the first pivot, and a second arm connected to the windshield base at a second point.

9. The windshield assembly of claim 8, the second point is disposed upwardly and rearwardly of the first point when the windshield is in the rest position, and the second point is disposed upwardly and forwardly of the first point when the windshield is in a rotated position.

10. The windshield assembly of claim 8, further comprising a second pivot at the second point permitting the windshield to rotate about a second pivot axis responsive to a force perpendicular to the windshield.

11. The windshield assembly of claim 8, wherein the left hinge and the right hinge are disposed at respective lateral sides at a lower end of the windshield base.

12. The windshield assembly of claim 8, wherein the hinge member further comprises a stopper arm which is configured to engage the deck panel after a predetermined rotation about the first pivot.

13. The windshield assembly of claim 12, wherein the predetermined rotation is at least 50 degrees.

14. The windshield assembly of claim 12, wherein the first arm extends along a portion of the deck panel, the second arm extends upwardly from the deck panel, and the stopper arm extends downwardly from the deck panel when the windshield is not rotated.

15. The windshield assembly of claim 14, wherein the stopper arm extends through an aperture in the deck panel and is configured to contact an underside of the deck panel when the windshield is rotated.

16. A vehicle comprising:
a vehicle body having at least one external surface;
a motor supported at least in part by the vehicle body;
a propulsion system connected to the vehicle body and operatively connected to the motor;
a windshield assembly comprising:
a windshield having a lower end and an upper end;
a windshield base attached to the lower end of the windshield; and
a deck panel connected to the vehicle body,
the deck panel being slidingly connected to the windshield base for permitting the windshield to move linearly, with respect to the deck panel, from a rest position, responsive to a force in a plane of the windshield, and
the deck panel being pivotally connected to the windshield base about a first pivot axis for permitting the windshield to rotate about the first pivot responsive to a force perpendicular to the windshield.

17. The vehicle of claim 16, further comprising a straddle seat and a handlebar, wherein the windshield assembly is positioned at least partially forward of the straddle seat and the handlebar.

18. The vehicle of claim 17, wherein the vehicle is a personal watercraft, and the vehicle body comprises a hull and a deck supported on the hull, the straddle seat being provided on the deck, and the windshield assembly being provided on the deck.

19. A windshield assembly for a vehicle, the windshield assembly comprising:
a windshield having a lower end and an upper end;
a windshield base attached to the lower end of the windshield; and
a deck panel connectable to the vehicle and movably connected to the windshield base by:
a first mechanism permitting the windshield to move linearly with respect to the deck panel responsive to a first force; and
a second mechanism permitting the windshield to rotate about a first pivot responsive to a second force.

20. The windshield assembly of claim 19, wherein the first mechanism is a resilient member linearly connecting the windshield base and the deck panel, and the second mechanism is a hinge member pivotably connecting the windshield base and the deck panel.

\* \* \* \* \*